United States Patent [19]

Hubred et al.

[11] Patent Number: 4,500,495
[45] Date of Patent: Feb. 19, 1985

[54] RECOVERING METALS FROM SPENT HYDROPROCESSING CATALYSTS

[75] Inventors: Gale L. Hubred, Richmond; Dean A. Van Leirsburg, Petaluma, both of Calif.

[73] Assignee: Chevron Research Company, San Francisco, Calif.

[21] Appl. No.: 519,180

[22] Filed: Aug. 1, 1983

Related U.S. Application Data

[63] Continuation-in-part of Ser. No. 422,813, Sep. 24, 1982, Pat. No. 4,432,953, and a continuation-in-part of Ser. No. 422,814, Sep. 24, 1982, Pat. No. 4,434,140, and a continuation-in-part of Ser. No. 422,987, Sep. 24, 1982, Pat. No. 4,434,141.

[51] Int. Cl.$^3$ .................. C01G 31/00; C01G 39/00; C01G 41/00; C01G 51/00
[52] U.S. Cl. .................................... 423/53; 423/54; 423/55; 423/62; 423/63; 423/65; 423/68; 423/139; 423/140; 423/143; 423/150; 75/101 BE
[58] Field of Search ............. 423/53, 55, 62, 63, 423/65, 68, 139, 140, 143, 150; 75/101 BE

[56] References Cited

U.S. PATENT DOCUMENTS

| | | | |
|---|---|---|---|
| 2,928,732 | 3/1960 | Bare et al. | 75/103 |
| 3,083,085 | 3/1963 | Lewis et al. | 423/63 |
| 3,320,024 | 5/1967 | Burwell | 423/63 |
| 3,567,433 | 3/1971 | Gutnikov | 423/68 |
| 3,773,890 | 11/1973 | Fox et al. | 423/63 |
| 3,848,054 | 11/1974 | Wiewiorowski | 423/140 |
| 4,012,483 | 3/1977 | Kane et al. | 423/139 |
| 4,066,733 | 1/1978 | Dubeck et al. | 423/53 |
| 4,145,397 | 3/1979 | Toida et al. | 423/63 |
| 4,258,016 | 3/1981 | Siemens et al. | 423/139 |
| 4,289,605 | 9/1981 | Bartholic | 423/150 |

FOREIGN PATENT DOCUMENTS

| | | | |
|---|---|---|---|
| 115603 | 10/1978 | Japan | 423/63 |
| 109100 | 8/1979 | Japan | 423/54 |
| 1342400 | 1/1974 | United Kingdom | 423/139 |

Primary Examiner—Herbert T. Carter
Attorney, Agent, or Firm—S. R. La Paglia; V. J. Cavalieri

[57] ABSTRACT

A process for recovering the metal values from spent hydroprocessing catalyst particles. The metal values will include at least one metal of Group VIII of the Periodic Table and at least one metal of Group Vb or Group VIb of the Periodic Table. The spent catalyst particles are first roasted at between 400° C. and 600° C. and then contacted with a first aqueous solution of ammonia and an ammonium salt forming a first pregnant liquor. The once-leached spent hydroprocessing catalysts are contacted with a second aqueous solution of sulfur dioxide forming a second pregnant liquor. The metal values are precipitated from the second pregnant liquor with hydrogen sulfide and the precipitate is roasted with unroasted spent hydroprocessing catalysts. The metal values of Group Vb and Group VIb in the first pregnant liquor are transferred into a first organic solution by liquid ion exchange. The first organic solution is stripped by an aqueous strip solution and the metal values separated by sequential precipitation. The metals of Group VIII are separated and purified by serial liquid ion exchange.

8 Claims, 3 Drawing Figures

RECOVERING METALS FROM SPENT HYDROPROCESSING CATALYSTS

CROSS-REFERENCE TO RELATED APPLICATIONS

This application is a continuation-in-part of U.S. Ser. Nos. 422,813 and 422,814 and 422,987 all filed Sept. 24, 1982 and now U.S. Pat. Nos. 4,432,953, 4,434,140 and 4,434,141, respectively and all are incorporated herein by reference.

BACKGROUND OF THE INVENTION

This invention relates to methods of leaching and recovering metals from spent hydroprocessing catalysts.

One modern development in crude oil processing is the upgrading of metal and sulfur containing feedstocks, e.g., crude oils and residua by hydroprocessing methods. Such upgrading is necessary to convert the heavy feedstock into more valuable, lower boiling fractions and to remove contaminants, particularly metals and sulfur, that can pollute the atmosphere upon combustion.

Crude oils contain various dissolved contaminants, including nickel, vanadium, iron, and sulfur. The lighter fractions are frequently distilled off under atmospheric pressure or a partial vacuum leaving the metals in a high boiling fraction generally called the "residual fraction," or "residua." Residua will generally contain at least 35 ppm metal contaminants, frequently as high as 100 ppm, and in extreme cases, higher than 1000 ppm.

These metals and any sulfur present are removed, thereby upgrading the feedstock, by processing the feedstock, with a catalyst, in the presence of hydrogen. Such catalysts are generally a solid support that contains catalytic metals, generally either molybdenum or tungsten with either nickel or cobalt. As the catalyst is used, metals from the feedstock deposit on its exterior surface and the interior surface of its pores, eventually plugging the pores and reducing the activity of the catalyst to such an extent it does not give the desired product quality. Such catalysts are herein defined as "spent catalysts," and contain catalytic metals, an inorganic support matrix, metals removed from the feedstock, sulfur compounds, and a hydrocarbonaceous residuum.

Recently, the obtainable crude oil is tending to be heavier, forcing refiners to use more hydroprocessing catalysts than heretofore necessary to remove metals and sulfur from the feedstock. A shortage of the valuable catalytic metals, particularly cobalt, is therefore possible. In an effort to recycle both the catalytic metals and the catalyst supports, providing a renewable source of catalytic metals, efforts have been made to extract metals from hydroprocessing catalysts, particularly hydrodesulfurization and hydrodemetalation catalysts.

One general method of leaching hydroprocessing catalysts is disclosed in U.S. Pat. No. 3,567,433. An aqueous ammonia and ammonium salt leach solution is contacted with spent catalyst particles. The conditions of the system were not optimized, resulting in low metals recovery.

Another leaching process is disclosed in *Chemical Abstracts*, 94:178649x. A spent catalyst, containing aluminum, vanadium, nickel, cobalt, and molybdenum, was leached with ammonia and ammonium salts, at a temperature greater than 110° C. and an oxygen partial pressure of greater than 1 kg/cm$^2$, for more than ½ hour.

Other methods of recovering metals from spent demetalation or desulfurization catalysts are known. U.S. Pat. No. 4,216,118 discloses chlorinating spent catalysts to convert vanadium values to vanadium tetrachloride and nickel values to nickel chloride for recovery by solvent extraction. U.S. Pat. No. 4,145,397 discloses recovery of metals from spent catalysts by roasting at high temperatures and leaching with caustic alkali.

An article in *Engineering and Mining Journal*, May 1978, page 105, describes a plant to process spent catalysts containing no cobalt by first leaching with sodium hydroxide and then with ammonium carbonate.

Cobalt is a particularly difficult metal to remove from hydroprocessing catalysts by conventional aqueous leaching techniques. Under optimum leaching conditions, an aqueous leach solution of ammonia and an ammonium salt rarely removes more than about 50 percent of the cobalt present on the spent catalyst. It has been discovered that if the spent catalysts are leached by a first aqueous solution of ammonia and ammonium salt and subsequently leached by a second aqueous solution having sulfur dioxide dissolved therein, total recovery of cobalt can be well over 90 percent of the metal present on the initial spent catalyst.

SUMMARY OF THE INVENTION

This invention provides a process for recovering the metal values from spent hydroprocessing catalyst particles where said values include at least one metal of Group VIII of the Periodic Table and at least one metal of the Group consisting of Group Vb and Group VIb of the Periodic Table, comprising:

(a) roasting the particles in an atmosphere containing molecular oxygen in a temperature in the range of between 400° C. and 600° C.;

(b) leaching the particles with a first aqueous solution containing ammonia and an ammonium salt at a temperature less than the atmospheric boiling point of said first aqueous solution, forming a first pregnant liquor and once leached particles;

(c) separating the once leached particles from the first pregnant solution;

(d) leaching the once-leached particles with a second aqueous solution containing sulfur dioxide, forming a second pregnant liquor and twice-leached particles;

(e) separating the second pregnant liquor from the twice-leached particles;

(f) precipitating metal sulfides from the second pregnant liquor by the addition of hydrogen sulfide;

(g) roasting said precipitated metal sulfides with fresh spent catalyst in step (a);

(h) transferring the metal values contained in the first pregnant liquor of the Group consisting of Group Vb and Group VIb metals into a first organic solution by liquid ion exchange;

(i) stripping said metal values from said first organic solution with a first aqueous strip solution; (j) separating said metal values by sequential precipitation;

(k) selectively transferring the metal values of Group VIII of the Periodic Table from said first pregnant liquor into at least one second organic solution by serial liquid ion exchange;

(l) stripping each of said second organic solutions forming single metal containing aqueous solutions.

DETAILED DESCRIPTION OF THE PREFERRED EMBODIMENTS OF THE INVENTION

Leaching

Metals deposited on hydroprocessing catalysts, and in particular the combination of nickel, cobalt, molybdenum and vanadium, can all be removed simultaneously from spent hydroprocessing catalysts by the use of an aqueous leach solution of ammonia and an ammonium salt. Spent hydroprocessing catalysts can be regarded as a high grade ore that contains a peculiar metals composition. Leaching is the method of choice for metals removal from this particular ore since the supports are porous and the metals individually are all known to be leachable; however, to simplify downstream separation of the metals and allow maximum recovery of the inorganic support matrix intact, the leaching conditions chosen should not allow iron, a frequent contaminant of oil, or the inorganic support to be leached.

One of the more valuable metals in spent catalyst is cobalt. Typically, less than 50 percent of the cobalt on the catalyst is leached with an aqueous solution of ammonia. It has been found that by contacting the once-leached catalyst from an ammonia leach with a second aqueous leach having sulfur dioxide ($SO_2$) dissolved therein, it is possible to recover greater than 90% of the total initial amount of cobalt present on the unroasted spent catalyst.

To simplify downstream processing, it is preferable to process one aqueous metals-containing stream. The best choice, for processing, is an aqueous ammoniacal stream. To place the metals leached by the aqueous $SO_2$ solution into the ammoniacal solution, the metals are precipitated as sulfides. The metal sulfides so recovered are mixed with unroasted spent catalyst and reroasted and releached with the first aqueous ammoniacal solution. The first pregnant liquor, the metals-containing product of the first aqueous solution, therefore will have an equilibrium value of cobalt greater than that if the feed were only spent catalysts.

The spent catalyst, as it comes from the catalytic reaction vessel, is highly contaminated with carbonaceous deposits, also termed "coke," and sulfur. These contaminants are easily removed by combustion in an atmosphere containing molecular oxygen, for example, air, but it has been found that the amount of metals leached from the catalyst particles, particularly nickel, tends to suffer if the catalyst is roasted at too high a temperature. Preferable conditions for reaction with oxygen are at less than 600° C., preferably between 400° C. and 500° C. Temperature can be controlled by diluting the oxygen with nitrogen or by other methods known to the art. The catalyst so treated is free from substantial carbonaceous residue and the metals contained therein can be easily removed by a first aqueous leach. The first aqueous leach solution is a solution of ammonia and an ammonium salt. Such a solution will be alkaline, which is preferred to solubilize vanadium and molybdenum, and will contain free ammonia, an effective complexing agent for nickel and cobalt. Ammonia and ammonium carbonate solutions are especially well suited as they allow reagent recycle by means of distillation of the pregnant liquor and reabsorbtion in fresh or recycle aqueous solution. Ammonium sulfate is another preferred ammonium salt for the practice of this invention. Nickel and cobalt will be free cations and form ammine complexes, and molybdenum and vanadium will be in the form of anionic oxide ions and will form ammonium salts.

The catalyst support of the spent catalyst particles will frequently be alumina. However, mixtures of alumina with other refractory inorganic oxides, for example, silica, boria, magnesia and titania, as well as supports that contain naturally occurring alumina-containing clays, for example, kaolin or halloysite, may be leached by the process of this invention.

It will be understood that the catalyst will typically be in the form of uniformly shaped particles, elongated extrudates or spherical particles. Other shapes may be processed by the method of this invention. The catalyst may be crushed or otherwise processed to change its shape before the application of this invention.

In a buffered system such as the ammonia and ammonium salt leach system, two factors must be adjusted for optimal extraction: the concentration of leaching species and the pH of the leach solutions. The solution must contain sufficient ammonia to complex the nickel and cobalt present, and sufficient ammonium to control pH. The pH should be not lower than 9.5, or molybdenum and vanadium recoveries suffer, and not higher than 11, or nickel and cobalt recoveries suffer. A concentration of ammonia $NH_3(aq)$, hereinafter ammonia, plus $NH_4^+(aq)$, hereinafter ammonium, not exceeding 6 molar and having the ammonia concentration approximately equal to the ammonium concentration meets these requirements. It is preferred that the solution have at least a six-fold molar ratio of ammonia compared to the amount of cobalt ion plus nickel ion calculated to be on the spent catalyst particles. The molar concentration of the ammonium salt should not exceed about 2 molar, otherwise a vanadium complex precipitates. An especially preferred leach system is one where the ammonia concentration is initially substantially equal to the ammonium ion concentration and both species are present in about 2 molar concentrations.

It has been observed that the length of time of the leach is important for maximum cobalt yield. To maximize cobalt recovery, the catalyst particles should not be in contact with the leach solution for more than fifteen minutes. The temperature of the leach is also important. In general, the higher the temperature, the more any particular species will go into solution; but a practical upper limit is the boiling point of the solution at atmospheric pressure, above which a pressure vessel would be required. In practice, a temperature of between about 85° C. and 95° C. is found to be optimal. After 15 minutes at about 85° C., the leach solution will typically contain more than 85 percent of the molybdenum, about 75 percent to 80 percent of the nickel, 75 percent to 85 percent of the vanadium, and at least 45 percent of the cobalt. (These percentages refer to the amount by weight of metal in solution compared to the amount of metal that was on the spent catalyst before leaching.) Less than 0.1 percent of the alumina is extracted and less than 5 percent of the iron is extracted.

The once-leached catalyst particles are then removed from the first pregnant liquor and contacted with a second aqueous solution of sulfur dioxide made by either bubbling SO₂ directly into the leach tank or by separately making an aqueous solution of SO₂ and passing this premade solution into the leach tank. The temperature of this solution should be between 65° C. to 100° C. and preferably between 80° C. and 100° C. Since it is preferred to leach as much metal as possible with as little solution as possible, it is preferred that the second solution be as nearly saturated in SO₂ as possible.

The twice-leached catalyst is then removed from the second pregnant liquor and the metals dissolved therein are precipitated by addition of hydrogen sulfide to the solution. It has been observed that the typical metals precipitated are nickel, about 5 percent; molybdenum and vanadium, about 2 percent; and cobalt, about 35 percent; where percent refers to the amount present on the unroasted catalyst. The precipitated metal sulfides are removed from the second pregnant liquor and mixed with unroasted spent catalyst. The mix is roasted and leached with ammonia. The temperature of the second pregnant liquor should be cooled to between 10° C. and 30° C. before precipitation with H₂S. A concentration of about 0.1 molar H₂S in the second pregnant liquor will precipitate the metals of interest rapidly.

The alumina support of the catalyst tends to be leached into the second aqueous solution. Typical amounts can be as high as 10 percent of the total alumina. Since iron is not precipitated by hydrogen sulfide, this invention provides an easy separation of the valuable catalytic metals from the less valuable contaminant metals.

Extraction of Molybdenum and Vanadium

The first pregnant liquor from the ammoniacal leach is extracted sequentially with several liquid ion exchange reagents. The metal ions of interest can be divided into two categories. In the first category are metals from Group VIII, in particular cobalt and nickel, which are present in the pregnant liquor as cations. In the second category are metals selected from Group V and Group VI, in particular molybdenum, tungsten and vanadium, which are present in the pregnant liquor as oxyanions. In the practice of the present invention the oxyanions are extracted first. The metal values of Group V and Group VI are transferred into a first organic solution by a first liquid ion exchange. The extraction can be carried out directly on a pregnant liquor from an ammonia and ammonium salt leach solution. This solution typically has a pH of about 10 to 10.5. The preferred organic extractant is a quaternary ammonium compounds of the general formula $RR'_3N^+Cl^-$, where R is methyl and R' is a group ranging from $C_8$ to $C_{12}$. Such organic extractants are sold by Henkel Corporation under the trade name Aliquat ®336 and by Sherex Chemical Company, under the trade name of Adogen ®464, and obtainable from Aldrich Chemical as an impure compound of methyl tri-capryl ammonium chloride.

The quaternary ammonium compounds are in organic solution, preferably in hydrocarbon solution, for example, kerosene, which may be conditioned by a paraffinic alcohol such as decanol. Contacting the aqueous phase with the anion exchange reagent extracts both the molybdenum and the vanadium. The reaction can be generically depicted as:

$$Ma^{y-} + y/xR_xA \longrightarrow R_yMa + A^{x-}$$

where x and y are small whole numbers, typically between 0 and 10, and M is any Group V or VI metal oxyanion, and R can be any organic substituent that makes the quaternary amine sufficiently hydrophobic. It has been observed that when Aliquat ®336 is the anion exchange reagent, the extraction tends to be equilibrium limited by molybdenum. In practice it has been found that the use of multi-stage extraction units extracts molybdenum more readily than single stage extractions.

Stripping and Recovering Vanadium and Molybdenum Values

The metals are then stripped from the organic phase into aqueous phase by an aqueous solution of bicarbonate or carbonate solutions or other anion. A preferred stripping solution is saturated aqueous solution of ammonium bicarbonate at a pH of about 8 and a temperature of about 0° to 30° C. It has been observed that the stripping tends to be limited by vanadium. When vanadium is known to be present, the bicarbonate strip solution has been found to be particularly well suited for stripping vanadium values from the organic phase.

When the overall process involves leaching spent catalysts with an aqueous solution of ammonia and an ammonium salt, it is preferred that the stripping solution be a saturated solution of ammonium bicarbonate. In this way new ions are not introduced into streams, allowing easy recycling of the streams to earlier steps in the process. Ammonium is preferred since ammonium meta-vanadate is a preferred product of this process.

Vanadium, if present, can be recovered from the aqueous solution by adjusting its pH to about 7 by addition of concentrated HCl. The chloride ion has been found to be important for the kinetics of the vanadium metavanadate precipitation. See the method discussed in *Zhurnal Prikladnoi Khimii*, 43, p. 949-954, 1970. Excess ammonium chloride is added to the aqueous solution and any ammonium chloride not dissolved is removed by filtration creating saturated ammonium chloride solution. The solution is warmed to 75° to 80° C. for 20 minutes then cooled slowly over a period of about 30 minutes to about 30° C. The solution is further cooled to about 0° C. for three hours. Crystals are collected while the solution is cold by filtration and washed with cold H₂O.

The resulting aqueous solution may contain either molybdenum or tungsten or no metals at all. The molybdenum or tungsten can be recovered by reducing the volume of the solution until the metals start to precipitate. The precipitation can be aided by adding an appropriate ion to form a less soluble salt, for example, calcium hydroxide may be added to precipitate the less soluble calcium molybdate.

Extracting and Recovering Cobalt and Nickel

The Group VIII metals, still in the first pregnant liquor solution, are each selectively placed into an organic solution, by serial liquid ion exchange. Each organic solution so formed is then stripped forming an aqueous solution containing the Group VIII metal. The most prevalent Group VIII metals in the present liquor of spent hydrodesulfurization or hydrodemetalation catalysts are nickel and cobalt.

Nickel is extracted with an organic nickel extractant. Preferred organic extractants include oximes. The hydrdoxy oxime component has the general formula where R, R', and R" may be a variety of organic hydrocarbon radicals such as aliphatic and alkyaryl radicals. R" may also be hydrogen. Preferably, R and R' are unsaturated hydrocarbons or branched chain alkyl groups containing from about 6 to about 20 carbon atoms. R and R' are also preferably the same. It is also preferred that R" is hydrogen or unsaturated hydrocarbon or branched chain alkyl groups containing from about 6 to 20 carbon atoms.

Suitable oximes are disclosed, for example, in U.S. Pat. Nos. 3,224,873, 3,592,775, 3,455,680, 3,428,499, 3,276,863 and 3,197,274. Particularly suitable extractants comprise 2-hydroxy-4-nonylbenzophenoxime which is a primary extractant in a composition also containing an alpha-hydroxy oxime sold by Henkel Corporation under the trade name of LIX®64N; 8-diethyl-7-hydroxy-6-dodecanoneoxime, which is the primary extractant in a composition sold by Henkel Corporation under the trade name of LIX®63; and 2-hydroxy-4-dodecylbenzophenoxime, which is primary extractant in a composition also containing an alpha-hydroxy oxime sold by Henkel Corporation under the trade name of LIX®64.

The preferred extracting agent is LIX®64N. This agent contains about 46 to 50% beta-hydroxybenzophenoneoxime and about 1 to 2% of an aliphatic alpha-hydroxyoxime in a hydrocarbon diluent such as kerosene. This extracting agent provides nearly quantitative extraction of nickel and provides a very high degree of separation for nickel (II) over cobalt (III).

Nickel is stripped from the extractant by any conventional stripping solution, for example, sulfuric acid.

Cobalt is extracted next in the serial extractions. The cobalt in the pregnant liquor is in the +3 oxidation state and must be reduced to the +2 oxidation state before it can be easily be extracted by conventional cobalt extracting agents. Cobalt (III) is conventionally reduced to cobalt (II) by contacting the cobalt (III) solution with cobalt metal. One form of cobalt metal for this reduction is cobalt shot.

The cobalt (II) is then extracted with an extracting agent containing a metal chelating beta-diketone extractant. A preferred extractant is a beta-diketone of the formula where n is 1 to 4, m is 0, 1 or 2 and R is an alkyl group of 1 to 25 carbon atoms. The compounds and their preparation are disclosed in U.S. Pat. No. 4,152,396, and the disclosure of which is also incorporated herein by reference, and is sold by Henkel Chemical under the trade name of LIX®51. Other organic cobalt (II) extractants include the oximes, dioximes and diketones aforementioned as nickel extractants. If the same extractant is used both for cobalt and nickel, selectivity can be provided by the oxidation state of cobalt.

Suitably, the metal chelating beta-diketone extractant is dissolved in kerosene with about 10–15% of a conditioning agent. Advantageously, the conditioning agent is an alcohol that contains about 10 carbon atoms with decanol being preferred. A preferred hydrocarbon is kerosene. An example of a preferred hydrocarbon is Kermac®470B, which is marketed by Kerr-McGee. The ratio of metal chelating beta-diketone to alcohol to hydrocarbon to be used is governed by considerations such as speed and completeness of phase separations and concentration of cobalt in the liquor to be extracted. When decanol and Kermac®470B are selected for use as the alcohol and the hydrocarbon respectively, the optimum decanol concentration is about 15 volume percent with a concentration range of about 10 to 20 volume percent being operative.

The maximum loading capacity of cobalt (II) on the 5 volume percent beta-diketone extractant solution is about 2.6 grams per liter. Beyond this level precipitation occurs in the organic phase. An organic solution containing about 5 volume percent of beta-diketone extractant, is typically sufficient to remove all the cobalt encountered from an ammoniacal leach of spent catalysts. Thus, it is preferred that the organic extractant solution for spent catalysts contains about 5 volume percent beta-diketone and about 15 volume percent decanol and about 75 to 85 volume percent Kermac®470B. Suitably the extraction step is carried out at a temperature in the range from about room temperature to about 40° C. and is carried out in one stage or two stages of countercurrent extraction. The loading of cobalt (II) on a beta-diketone extraction is strongly pH dependent. Cobalt (II) begins to load in weakly acidic solutions with the maximum loading taking place between pH 7.5 and 9.5. Thus, pH adjustment by evaporation of ammonia from the leach liquor prior to extraction of nickel values aids cobalt (II) extraction. If necessary, the pH may be further adjusted at this time by addition of sulfuric acid or ammonium hydroxide depending on whether the pH needs to be adjusted upward or downward. It has been found that extractions are favorable in solutions with less than 50 grams per liter of ammonia concentration.

The organic phase containing cobalt may be stripped by several of any alternative methods. One conventional stripping technique frequently used, is stripping the cobalt values with sulfuric acid to produce cobalt sulfate in an aqueous phase. Another stripping method found to work is the use of an ammonia and ammonium salt solution to strip cobalt from the organic phase.

An alternative method is adding other metallic ions, for example, copper (II) or nickel (II), to "crowd" the cobalt from the organic extractant freeing the cobalt into an aqueous solution.

The aqueous solutions of Group VIII metals produced by this invention can be processed further to produce pure metal or a salt that can be directly reused to form new catalyst. Nickel or cobalt can be electrowon or directly reduced by hydrogen gas. The aqueous solutions of nickel or cobalt can be used directly as a metal source for impregnating or comulling new catalyst.

DETAILED DESCRIPTION OF THE DRAWING

Figure 1:
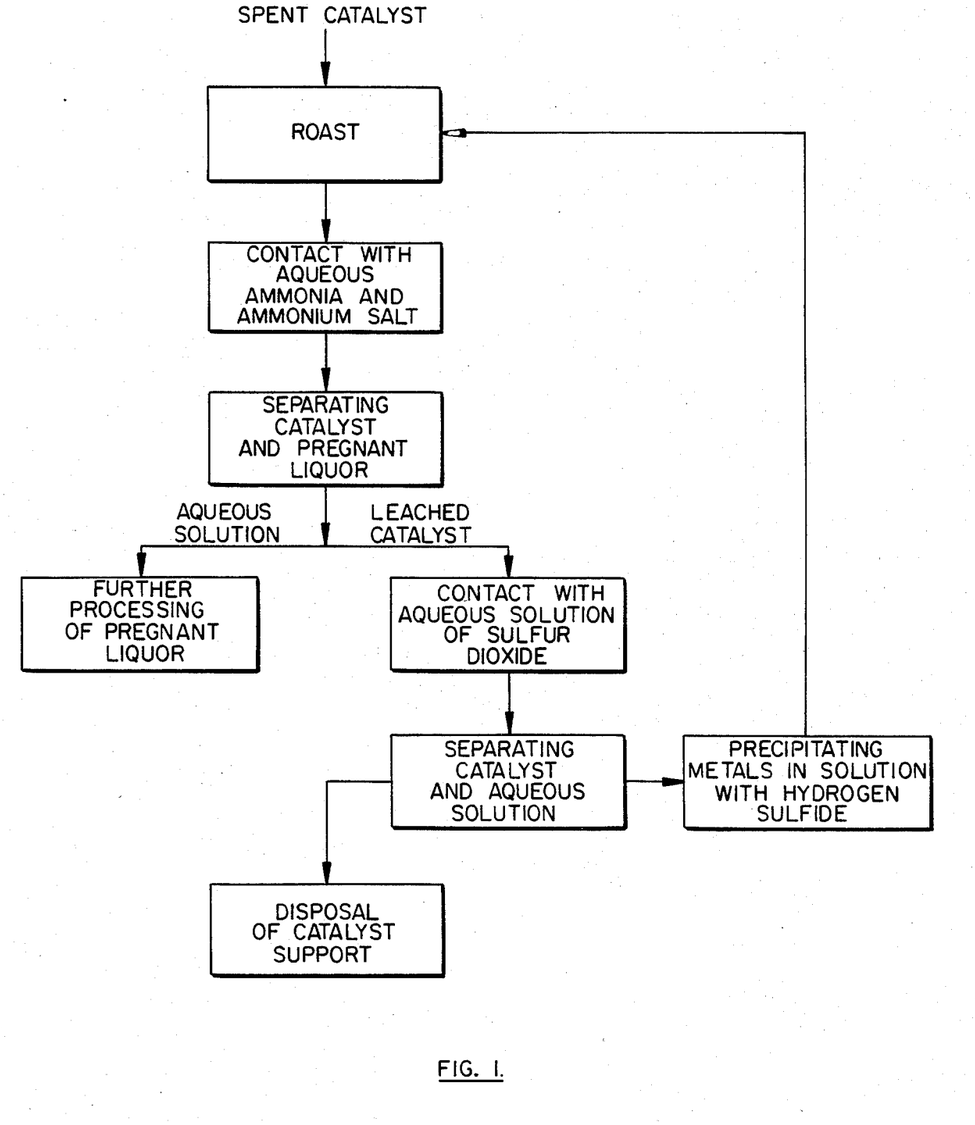
FIG. 1 is a flow diagram showing the details of the leaching steps of this invention.

FIG. 1 shows in detail the leaching steps of this invention. Spent catalyst is roasted at 400° C. to 600° C.

The roasted catalyst is then contacted with an aqueous solution containing both ammonia and an ammonium salt. The temperature of this leach is maintained at about 90° C. The first pregnant liquor is further processed, as shown in FIG. 1. The once-leached catalyst is contacted with a saturated solution of sulfur dioxide at between 65° C. to 100° C. and preferably between 80° C. and 100° C. The second pregnant liquor is removed from the twice-leached catalysts, which are disposed of. The second pregnant liquor is then contacted with hydrogen sulfide, precipitating metal values from the solution. The metal values precipitated are primarily cobalt and molybdenum. The precipitated sulfides are placed back into the roast to be reroasted and releached with the ammoniacal solution. In this manner, substantially all of the cobalt is recovered and an ammoniacal stream is provided for further processing.

Figure 2:
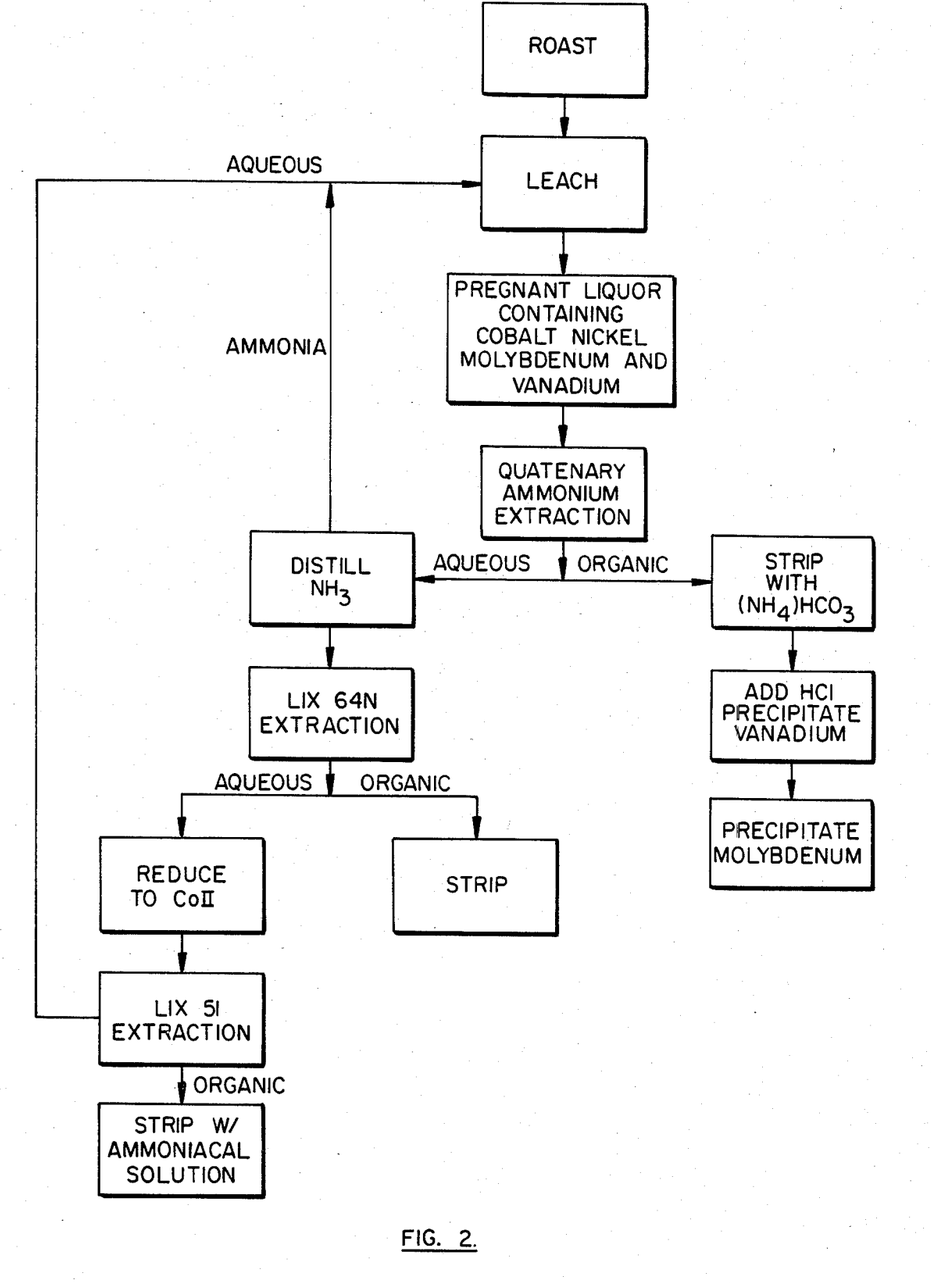
FIG. 2 is a flow diagram showing the total flow scheme of this invention.

FIG. 2 illustrates the total flow scheme of this invention. Metals are recovered from spent catalysts known to contain cobalt, nickel, molybdenum and vanadium. The catalyst is first roasted and leached as described above. The first pregnant liquor is then extracted with a quaternary amine, forming a first set of two streams: an organic stream containing molybdenum and vanadium, and an aqueous stream containing cobalt and nickel. The first organic stream is stripped with an aqueous solution of ammonium bicarbonate. Hydrochloric acid is added to the aqueous strip solution and ammonium metavanadate is precipitated. The volume of the solution is then reduced and ammonium molybdate is precipitated.

Excess ammonia is removed from the first aqueous stream, by heating the solution. The remaining first pregnant liquor is first exposed to air insuring that cobalt is in the trivalent oxidation state. It is then extracted with LIX®64N, removing the nickel and creating a second set of two streams: an aqueous stream containing cobalt and any impurities, and an organic stream containing nickel. The second organic solution is stripped with sulfuric acid, forming an acidic nickel-containing sulfate solution. The cobalt in the second aqueous stream is reduced over cobalt shot, and extracted with LIX®51, thereby forming a third set of aqueous and organic streams.

The third aqueous stream is recycled to the leach step, enriched in ammonia removed from the ammonia distillation step. The third organic stream is stripped with a solution of ammonia and ammonium carbonate.

By the use of the flow scheme in FIG. 1, a process is provided that is entirely compatible with an ammoniacal leach. Therefore, the pregnant liquor from the leach should be in aqueous ammoniacal solution.

EXAMPLES

The following examples show in detail the various steps of the claimed invention.

EXAMPLE 1

This Example shows the ammoniacal leach step of the present invention.

A spent hydrodesulfurization catalyst containing 1.45 weight percent cobalt and 6.75 weight percent molybdenum was obtained from pilot plant service. The catalyst particles contained, in addition to the catalytic metals, 1.62 weight percent nickel and 6.24 weight percent vanadium, as well as 9.86 weight percent carbonaceous deposits and 12.3 weight percent sulfur.

The catalyst particles were roasted in a bed about 0.75 inches deep at 310° C. for 3 hours, then at 438° C. for 3 hours. The temperature never exceeded 450° C. At the end of the roast, the particles had lost 10.2 percent of their original weight. This weight loss was attributed to oxidation, and subsequent loss to the atmosphere of carbon and sulfur.

A leach solution was prepared by dissolving 179 grams $(NH_4)_2CO_3$ in 1 liter of a 2M aqueous solution of $NH_4OH$. Ninety-eight grams of catalyst particles, roasted as above, were placed in a 5-liter flask heated to 85° C. Aliquots were taken every 5 minutes and analyzed by Inductively Coupled Plasma (ICP) to determine metals content.

Table I shows the results.

TABLE I

| Time (minutes) | % Metals Extracted | | | | | |
|---|---|---|---|---|---|---|
| | [Co] | [Ni] | [Mo] | [V] | [Fe] | [P] |
| 5 | 47 | 73 | 86 | 74 | 3.6 | 15 |
| 10 | 47 | 73 | 86 | 76 | 5.7 | 17 |
| 28 | 44 | 85 | 86 | 84 | 4.2 | 28 |

The concentrations of nickel, molybdenum and vanadium, in the leach liquor, increase with time, but the concentration of cobalt tends to decrease after about 10 minutes. The leach time can be varied to increase the amount of any metal that is desired. Since phosphorous may interfere with downstream processing of the leach liquor and is not a valuable metal to be recovered, stopping the leach when the solution contains low amounts of phosphorous is preferable. Although this example was leached at 85° C., the spent catalysts could have been leached at any temperature between 75° C. and the boiling point of the solution, but preferably between 85° C. and 95° C.

EXAMPLE 2

This Example shows another ammoniacal leach, as done according to this invention.

Spent hydrodesulfurization catalyst containing 1.4 weight percent cobalt, 6.3 weight percent molybdenum, 2.2 weight percent nickel, and 4.2 weight percent vanadium was roasted for 2 hours at 427° C. under a slight flow of air. When substantially all the carbonaceous and sulfurous residue was burned off, the roasting was stopped. When the particles had cooled, they were placed in 1 liter of solution made by dissolving 200 grams of $(NH_4)_2CO_3$ in 1 liter of 2M aqueous $NH_4OH$.

The solution was analyzed for metals after 20 minutes and 180 minutes. The results are shown in Table II.

TABLE II

| Time (minutes) | % Metals Extracted | | | |
|---|---|---|---|---|
| | [Co] | [Ni] | [Mo] | [V] |
| 20 | 48 | 71 | 89 | 68 |
| 180 | 31 | 83 | 97 | 87 |

It can be seen that with a great increase in the length of time of the leach, more nickel, molybdenum and vanadium were recovered, but the yield of cobalt had significantly fallen.

EXAMPLE 3

This is another Example of the ammoniacal leach of this invention.

Spent hydroprocessing catalyst particles were roasted at various temperatures and then placed in a solution of 1M (NH$_4$)$_2$CO$_3$ dissolved in 2M NH$_4$OH solution, except the run at 850° C. which was placed in 0.5M (NH$_4$)$_2$CO$_3$ in 2M NH$_4$OH. Aliquots of solution were removed at 15 minutes and 180 minutes and analyzed by ICP for metals content. The results are tabulated in Table III.

TABLE III

| Metal | Roast Temperature | | | | | | | |
|---|---|---|---|---|---|---|---|---|
| | 427° C. | | 600° C. | | 760° C. | | 850° C. | |
| | 15 min | 180 min | 15 min | 180 min | 15 min | 180 min | 15 min | 180 min |
| | % Metals Extracted | | | | | | | |
| Co | 48 | 31 | 46 | 26 | 32 | 34 | 32 | 15 |
| Mo | 89 | 97 | 70 | 74 | 81 | 89 | 52 | 62 |
| Ni | 71 | 83 | 45 | 46 | 19 | 28 | 8 | 21 |
| V | 68 | 87 | 70 | 73 | 103 | 107 | 80 | 81 |

The values given are percent of metals leached into solution compared to the metals content on unleached catalyst.

Nickel recovery suffers as the roast temperature of the spent catalyst particles is increased beyond 600° C. No metals are significantly better recovered than if the spent catalyst is roasted at 427° C. Cobalt recovery in general is better after 15 minutes at each roast temperature than after 180 minutes at the same roast temperature. It is, in general, best to stop the leach of the present invention after about one hour.

EXAMPLE 4

This Example shows the SO$_2$ leach of this invention. 30.00 grams of spent catalyst from pilot plant service were leached for 60 minutes in 600 ml of a saturated aqueous solution of SO$_2$. The temperature of the leach was 85° C.

TABLE IV

| | Fe | Ni | V | Al | Co | Mo |
|---|---|---|---|---|---|---|
| Heads ppm | 6200 | 7200 | 21100 | 353900 | 14500 | 13500 |
| Tails ppm | 3900 | 6200 | 18300 | 372400 | 3900 | 13400 |
| Percentage leached | 49.38 | 30.71 | 30.21 | 17.65 | 78.36 | 20.13 |

Analysis of Heads, Tails and final percentage leached is shown in Table IV.

EXAMPLE 5

This is another Example of the SO$_2$ leach of this invention. 9 grams of spent catalyst from pilot plant service were leached for 180 minutes in 170 ml of a saturated aqueous solution of SO$_2$ at 88° C.

Analysis of the heads, tails and percentage of metals leached is shown in Table V.

TABLE V

| | Fe | Ni | V | Co | Mo |
|---|---|---|---|---|---|
| Heads, ppm | — | 8500 | 13000 | 23000 | 8800 |
| Tails, ppm | 1914 | 3064 | 7527 | 2577 | 7869 |
| Percentage leached | — | 71.28 | 53.94 | 91.09 | 28.86 |

EXAMPLE 6

This Example shows the extent of metals precipitation from the SO$_2$ leach solutions derived in the previous two examples. Metal sulfides were precipitated by bubbling H$_2$S through solutions cooled to room temperature and having a pH between 3.5 and 4.0. The percent metals removed from each SO$_2$ leach liquor is shown in Table VI.

TABLE VI

| Solution | Co | Mo | Ni | V |
|---|---|---|---|---|
| 1 | 97.7 | >98.6 | >96.0 | 92.7 |
| 2 | 97.3 | 90.1 | >94.9 | 58.2 |

EXAMPLE 7

This Example shows a coextraction of molybdenum and vanadium from a pregnant liquor. The pH of the aqueous solution was varied. It was found that the most efficient extraction was at pH 10.4, which is about as high as practical in an ammoniacal solution. The organic extraction solution was 10% Aliquat ® 336 in kerosene with 10% decanol added. The aqueous feed solution had 2.4 g/l molybdenum, 3.1 g/l vanadium and a pH of about 10.1. The pH was raised by addition of NH$_4$OH and lowered by addition of H$_2$SO$_4$. The aqueous phase and organic phase were contacted at room temperature in a separating funnel. The volume of aqueous solution equaled the volume of organic solution. The results are tabulated in Table VII.

TABLE VII

| pH 25° | Contact Time, (Min.) | Mo | | | V | | |
|---|---|---|---|---|---|---|---|
| | | g/liter Org | g/liter Aq | D = Org/Aq | g/liter Org | g/liter Aq | D = Org/Aq |
| 10.4 | 10 | 1.06 | 1.28 | 0.83 | 2.83 | 0.43 | 7.1 |
| 10.1 | 10 | 0.86 | 1.62 | 0.53 | 2.97 | 0.40 | 7.4 |
| 9.6 | 10 | 0.60 | 1.88 | 0.32 | 3.11 | 0.43 | 7.8 |
| 10.1 | 20 | 0.88 | 1.63 | 0.49 | 3.14 | 0.41 | 7.8 |

EXAMPLE 8

This Example shows the effect of varying bicarbonate concentrations in ease of stripping metals from a solution of 10% Aliquat ® 336 in 10% decanol and kerosene loaded with both molybdenum and vanadium. Aqueous solution having the following concentrations of NH$_4$HCO$_3$ were made: 6.84, 13.68, 20.52, 100.0 and 200.0 grams per liter. An aqueous to organic ratio of 1:1 was used for all concentrations.

The results of the experiments are tabulated in Table VIII.

TABLE VIII

| [NH$_4$HCO$_3$] | INITIAL | | FINAL | | |
|---|---|---|---|---|---|
| | | Mo* | Mo | | |
| g/l | pH | org (g/l) | org (g/l) | aq (g/l) | pH |
| 6.84 | 8.29 | 3.3 | 2.9 | 0.26 | 8.73 |
| 13.68 | 8.20 | 3.3 | 2.5 | 0.68 | 8.52 |
| 20.52 | 8.20 | 3.3 | 2.1 | 1.1 | 8.42 |
| 100.0 | 8.21 | 3.3 | 0.4 | 2.9 | 8.07 |
| 200.0 | 8.34 | 4.0 | 0.3 | 3.7 | 8.41 |

| [NH$_4$HCO$_3$] | INITIAL | | FINAL | | |
|---|---|---|---|---|---|
| | | V* | V | | |
| g/l | pH | org (g/l) | org (g/l) | aq (g/l) | pH |
| 6.84 | 8.29 | 6.3 | 6.132 | 0.025 | 8.62 |
| 13.68 | 8.20 | 6.3 | 6.140 | 0.081 | 8.45 |
| 20.52 | 8.20 | 6.3 | 6.010 | 0.182 | 8.36 |
| 100.0 | 8.21 | 5.2 | 3.476 | 2.070 | 8.07 |
| 200.0 | 8.34 | 5.2 | 1.247 | 3.360 | 8.45 |

*Analysis for metal concentrations in solution was done by Atomic Absorption.

EXAMPLE 9

Two organic solutions, one having 3.367 g/l of molybdenum loaded on 10% Aliquat ® 336 in 10% decanol in kerosene, the other having 6.292 g/l vanadium loaded onto 10% Aliquat ® 336 in 10% decanol in kerosene, and two aqueous solutions one with 20 g/l $NH_4HCO_3$ and the other with 200 g/l $NH_4HCO_3$ were made up. A variety of organic to aqueous ratios were chosen and the results tabulated in Tables IX and X.

TABLE IX

| Ratio | 20 g/l $NH_4HCO_3$ | | | 200 g/l $NH_4HCO_3$ | | |
|---|---|---|---|---|---|---|
| | pH | org (g/l) | aq (g/l) | pH | org (g/l) | aq (g/l) |
| 15/1 | 8.97 | 3.019 | 1.389 | 8.70 | 2.517 | 9.412 |
| 10/1 | 8.93 | 2.994 | 1.459 | 8.52 | 1.562 | 14.182 |
| 5/1 | 8.87 | 3.189 | 1.540 | 8.35 | 1.036 | 11.871 |
| 2/1 | 8.59 | 2.606 | 1.318 | 8.22 | 0.431 | 6.096 |
| 1/1 | 8.40 | 2.217 | 1.097 | 8.09 | 0.248 | 3.315 |
| 1/2 | 8.19 | .570 | 0.808 | 8.02 | 0.151 | 1.743 |
| 1/5 | 8.19 | 1.182 | 0.428 | 8.03 | 0.100 | 0.705 |
| 1/10 | 8.19 | 0.660 | 0.266 | 8.00 | 0.119 | 0.350 |
| 1/15 | 8.17 | 0.635 | 0.179 | 8.00 | 0.127 | 0.234 |

Table IX shows the data for stripping the Mo solution.

TABLE X

| Ratio | 20 g/l $NH_4HCO_3$ | | | 200 g/l $NH_4HCO_3$ | | |
|---|---|---|---|---|---|---|
| | pH | org (g/l) | aq (g/l) | pH | org (g/l) | aq (g/l) |
| 15/1 | 9.03 | 6.412 | 0.162 | 8.52 | 5.228 | * |
| 10/1 | 8.97 | 6.306 | 0.175 | 8.35 | 5.326 | * |
| 5/1 | 8.6 | 6.144 | 0.179 | 8.32 | 3.850 | * |
| 2/1 | 8.44 | 6.080 | 0.177 | — | 2.310 | * |
| 1/1 | 8.53 | 6.144 | 0.178 | 8.10 | 0.743 | 5.700 |
| 1/2 | 8.25 | 5.715 | 0.151 | 8.03 | | 0.251 |
| 1/5 | 8.17 | 5.690 | 0.137 | 8.00 | 0.186 | 1.112 |
| 1/10 | 8.17 | 5.131 | 0.112 | 8.02 | 0.352 | 0.800 |
| 1/15 | 8.20 | 5.050 | 0.100 | 7.99 | 0.277 | 0.385 |

*Precipitate Present

Table X shows the data for stripping V from the organic. One unusual feature of the 200 g/l $NH_4HCO_3$ strip noted is a greenish color not in the pregnant aqueous solution present in the 20 g/l $NH_4HCO_3$ solution. It is suspected that this may indicate the formation of a previously unreported vanadium species.

EXAMPLE 10

The greenish solution of Example 8 was analyzed by Raman spectroscopy.

TABLE XI

| Transition Energy ($cm^{-1}$) | Intensity | Assignment |
|---|---|---|
| 1063 | M | $CO_3^{2-}$ |
| 1019 | VS | $HCO_3^{2-}$ |
| 917 | VS | Vanadium V carbonate complex |
| 888 | sharp | ? |
| 674 | W | $CO_3^{2-}$ |
| 633 | W | $HCO_3^-$ |
| 438 | M | Vanadium V carbonato complex |
| 347 | W | " |

Figure 3:
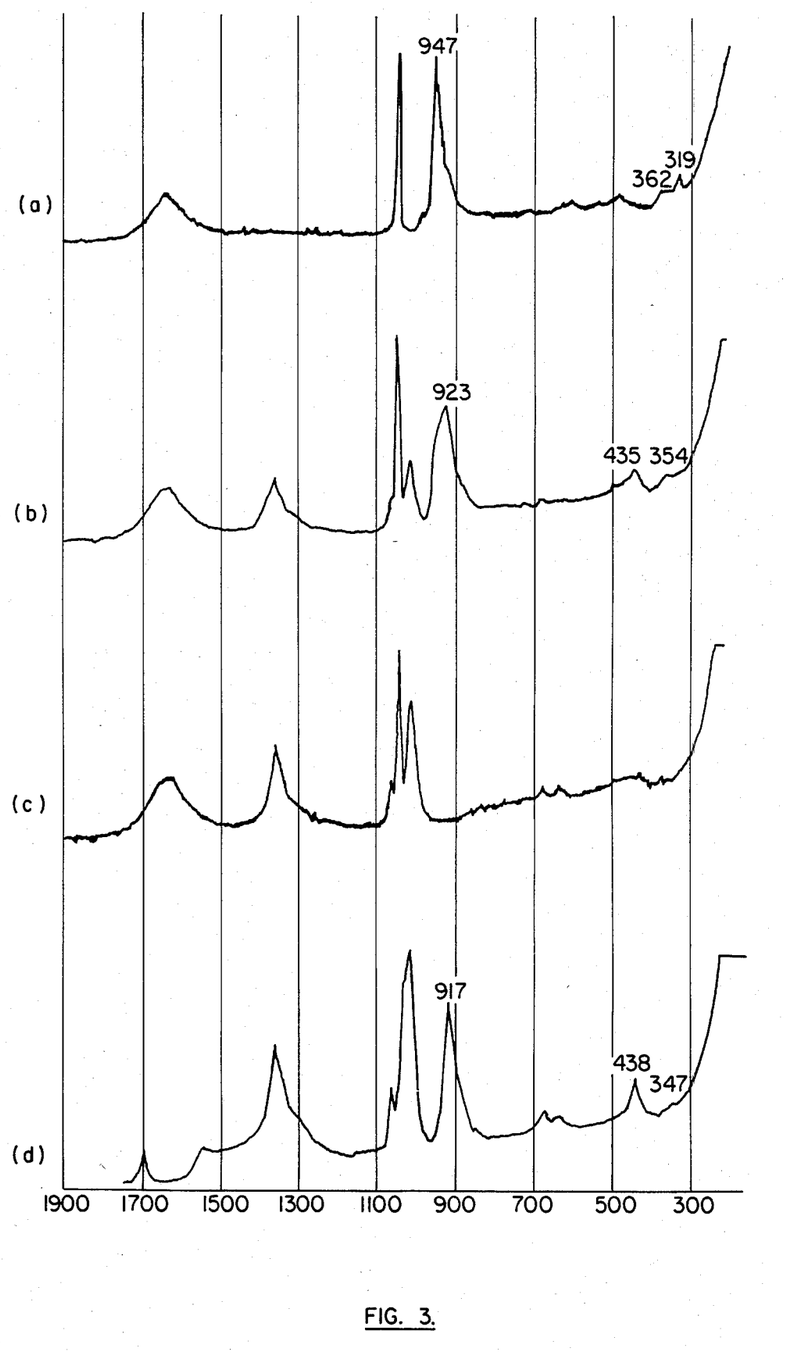
FIG. 3 is a Raman Spectrum of a novel vanadium bicarbonate complex.

Raman spectroscopy provides strong evidence for a vanadium V carbonato complexes. Table XI shows the Raman bands of some vanadium containing solutions and their assignment. All solutions were adjusted to pH 8.8 using either nitric acid or sodium hydroxide. Sodium bicarbonate solutions containing vanadium show an intense Raman band at 923 $cm^{-1}$ and a moderate bands at 435 $cm^{-1}$ and 354 $cm^{-1}$ as shown in FIG. 3B and ammonium bicarbonate aqueous strip solution containing vanadium shows these transitions at 917 $cm^{-1}$, 438 $cm^{-1}$, and 347 $cm^{-1}$ in FIG. 3D. Neither vanadium-free sodium bicarbonate, FIG. 3C, nor bicarbonate-free metavanadate solution, FIG. 3A, showed these bands. In addition, we have noted that vanadium bicarbonate solutions usually have a characteristic light green color which we suspect is due to the complex.

EXAMPLE 11

This example shows the results of costripping both Mo and V from loaded organic solvent with 200 g/l $NH_4HCO_3$ solution. An organic solution was prepared that had 3 g/l molybdenum and 6 g/l vanadium dissolved in a kerosene solution containing 10% Aliquat ® 336 and 10% decanol. Various organic to aqueous ratios were tried. The data is tabulated in Table XII.

TABLE XII

| Ratio | pH | org (g/l) | aq (g/l) | org (g/l) | aq (g/l) |
|---|---|---|---|---|---|
| 15/1 | 8.49 | 0.168 | * 5.175 | * | |
| 10/1 | 8.51 | 0.077 | * 4.226 | * | |
| 5/1 | 8.52 | 0.104 | * 4.664 | * | |
| 2/1 | 8.29 | 0.051 | * 2.166 | * | |
| 1/1 | 8.16 | 0.030 | * 0.750 | * | |
| 1/2 | 8.01 | 0.015 | 0.083 | 0.321 | 3.048 |
| 1/5 | 8.03 | 0.008 | 0.034 | 0.234 | 1.305 |
| 1/10 | 8.00 | 0.007 | 0.016 | 0.211 | 0.603 |
| 1/15 | 8.00 | 0.012 | 0.011 | 0.349 | 0.393 |

*an insoluble ppt formed

EXAMPLE 12

This example illustrates the production of a cobalt (II) solution from an aqueous solution initially containing both nickel and cobalt.

Spent catalyst particles, from service in a hydrodesulfurization pilot plant, containing cobalt and molybdenum, as catalytic metals, were in contact with a feedstock containing high levels of vanadium and nickel, as contaminant metals. The catalyst particles were leached with aqueous ammonium carbonate/ammonia solution at a pH of about 10.5. After heating the solution to evaporate enough ammonia so that ammonia plus ammonium equals about 25 grams per liter at a pH of 9, nickel was extracted by LIX ® 64N in kerosene. The solution was then passed through a column of cobalt shot and the raffinate from this column containing 2.975 grams per liter of cobalt is extracted with 5 percent by volume LIX ® 51 in 10 percent decanol and 85 percent Kermac ® 470B at 50° C. The resulting organic solution was stripped with 2 molar ammonium carbonate solution in 15 molar ammonia solution that had its pH adjusted to 10.27 by addition of sulfuric acid. About 25 percent of the cobalt from the LIX ® 51 was removed during each contact with the ammonia strip. After several counter current extractions, the resulting cobalt (II) carbonate solution was evaporated to produce a cobalt containing brown powder, which is believed to be a mixed oxide, carbonate salt.

The cobalt (II) carbonate solution can be directly recycled to catalyst manufacture or can be processed to produce a cobalt product.

EXAMPLE 13

Various organic solutions containing cobalt in LIX ® 51 solution were stripped with aqueous solutions of ammonia and ammonium carbonate. The organic solutions were 5% LIX ® 85% Kermac ® 470B and 10% decanol. The concentration of cobalt in the organic phase was 2.65 g/l in the 3M and 5M ammonia cases and 3.1 g/l in the 15M ammonia case. The volume ratio of organic (O)/aqueous (A) was varied. The results are tabulated in Table XIII.

TABLE XIII

COBALT STRIPPING WITH AMMONIA SOLUTION
ORGANIC PHASE: 5% LIX ® 51, 85% KERMAC ® 470B
AND 10% DECANOL TEMPERATURE 50° C.
ORGANIC CONCENTRATION/AQUEOUS
CONCENTRATE (g Co/LITER)

| Stripping Solutions | | | | |
|---|---|---|---|---|
| $NH_3$ M | 15 | 5 | 5 | 3 |
| $(NH_4)_2CO_3$ M | 2 | 2.5 | 2.5 | 1.5 |
| Kjeldahl $NH_3$ (g/l) | 206 | | | |
| $pH_{RT}$ | 10.27 | 10.58 | 10.4 | 10.27 |
| Volume Phase Ratio (O/A) | | | | |
| 15/1 | 2.72/0.42 | — | | 3.08/0.23 |
| 10/1 | 2.69/0.31 | 2.98/1.21 | 3.0/1.05 | 3.08/0.23 |
| 5/1 | 2.45/0.51 | 2.94/0.82 | 2.98/0.81 | 3.04/0.31 |
| 2/1 | 2.28/0.53 | 2.83/0.52 | 2.86/0.47 | 3.02/0.16 |
| 1/1 | 2.00/0.97 | 2.84/6.32 | 2.82/0.28 | 3.01/0.12 |
| 1/2 | 1.74/0.30 | 2.67/0.21 | 2.77/0.17 | 2.86/0.081 |
| 1/5 | 1.49/0.23 | 2.45/0.12 | 2.52/0.094 | 2.88/0.045 |
| 1/10 | 1.32/0.15 | 2.34/0.077 | 2.97/0.015 | 2.82/0.028 |
| 1/15 | 1.05/0.22 | 2.06/0.06 | 2.61/0.03 | 2.73/0.025 |

The data indicate that the cobalt goes into the aqueous phase from the organic phase more readily for the 15M ammonia case than for either the 5M or 3M cases. Therefore, at greater ammonia concentrations more cobalt is stripped if the pH is held at about 10.5.

The foregoing Examples are provided to aid in the practice of this invention, but not limit the scope of this invention beyond the scope of the appended claims.

What is claimed is:

1. A process to recover the metal values from spent hydroprocessing catalyst particles, said values including:
   (i) at least one metal value selected from the Group consisting of cobalt and nickel; and
   (ii) at least one metal value selected from the Group consisting of vanadium, molybdenum and tungsten; comprising:
   (a) roasting the particles in an atmosphere containing molecular oxygen at a temperature in the range of between 400° C. and 600° C.;
   (b) leaching the particles with a first aqueous solution of ammonia and an ammonium salt at a temperature less than the atmospheric boiling point of said first aqueous solution, forming a first pregnant liquor and once-leached particles;
   (c) separating the once-leached particles from the first pregnant solution;
   (d) leaching the once-leached particles with a second aqueous solution containing sulfur dioxide, forming a second pregnant liquor and twice-leached particles;
   (e) separating the second pregnant liquor from the twice-leached particles;
   (f) precipitating metal sulfides from the second pregnant liquor by the addition of hydrogen sulfide; and
   (g) roasting said precipitated metal sulfides with fresh spent catalyst in step (a);
   (h) transferring said molybdenum, tungsten and vanadium metal values from said first pregnant liquor into a first organic solution by means of a first organic liquid extractant comprising a quaternary ammonium compound;
   (i) stripping said first organic solution with a first aqueous ammonium bicarbonate stripping solution to form an aqueous solution containing said molybdenum, tungsten and vanadium metal values;
   (j) transferring nickel values from said first pregnant liquor into a second organic solution by means of an organic nickel extractant comprising an oxime;
   (k) reducing cobalt metal values in said pregnant liquor to divalent cobalt;
   (l) transferring cobalt metal values from said pregnant liquor into a third organic solution by means of an organic cobalt extractant selected from the group consisting of dioximes, hydroxy-oximes, and beta-diketones;
   (m) stripping each of said second and third organic solutions with aqueous stripping solutions to form a cobalt-containing aqueous solution and a nickel-containing aqueous solution.

2. The process of claim 1 wherein said spent hydroprocessing catalysts are supported on alumina.

3. The process of claim 1 wherein said first aqueous solution has a pH maintained in the range of 9.5 to 11 and concentrations of ammonia plus ammonium do not exceed 6 molar.

4. The process of claim 1 wherein the pH of said second aqueous solution is maintained at between 2.5 and 3.

5. The process of claim 4 including in step (i) precipitating molybdenum values by reducing volume of the strip solution.

6. The process of claim 1 including in step i by pecipitating vanadium values and cooling the strip solution.

7. The process of claim 1 wherein said nickel extractant comprises oximes selected from the group consisting of dioximes and hydroxy-oximes.

8. The process of claim 1 including removing ammonia by distillation before step (k).

* * * * *

UNITED STATES PATENT AND TRADEMARK OFFICE
CERTIFICATE OF CORRECTION

PATENT NO. : 4,500,495

DATED : February 19, 1985

INVENTOR(S) : Gale L. Hubred, et al.

It is certified that error appears in the above-identified patent and that said Letters Patent is hereby corrected as shown below:

Col. 7, line 44, "can be easily be extracted" should read --can easily be extracted--.

Signed and Sealed this

Third Day of September 1985

[SEAL]

Attest:

DONALD J. QUIGG

Attesting Officer     Acting Commissioner of Patents and Trademarks - Designate